United States Patent [19]

Imae et al.

[11] Patent Number: 5,011,728

[45] Date of Patent: Apr. 30, 1991

[54] MOLDING METHOD FOR MANUFACTURE OF A RESIN MOLDED PART

[75] Inventors: Eiji Imae; Yasuo Imura, both of Osaka, Japan

[73] Assignee: Suehiro Industrial Co., Ltd., Osaka, Japan

[21] Appl. No.: 465,539

[22] Filed: Jan. 17, 1990

Related U.S. Application Data

[63] Continuation of Ser. No. 258,056, Oct. 14, 1988, abandoned.

[30] Foreign Application Priority Data

Oct. 8, 1986 [JP] Japan .................................. 61-239798

[51] Int. Cl.⁵ ........................ B32B 3/00; H01H 13/06
[52] U.S. Cl. .................................... 428/156; 428/332;
428/192; 200/302.2; 200/333; 379/451;
455/128
[58] Field of Search .......................... 264/328.8, 328.1;
425/570, 573, 588; 200/347, 333, 302.1, 302.2;
428/156, 167, 172, 192, 332; 379/184, 186, 451;
455/128

[56] References Cited

U.S. PATENT DOCUMENTS

| 2,415,961 | 2/1947 | Nast | 264/328.8 |
| 3,669,598 | 6/1972 | Tucker | 264/328.8 |
| 3,995,008 | 11/1976 | Spiegelberg | 425/573 |
| 4,264,295 | 4/1981 | Hingley | 264/328.8 |
| 4,501,936 | 2/1985 | Morse | 200/333 |

FOREIGN PATENT DOCUMENTS

1186205 1/1965 Fed. Rep. of Germany ... 264/328.8

*Primary Examiner*—Ellis P. Robinson
*Assistant Examiner*—Donald J. Loney
*Attorney, Agent, or Firm*—Koda and Androlia

[57] ABSTRACT

A molding method for manufacture of a resin molded part having one or more flexibly movable, pushbutton-shaped thick projections formed integrally with a base through the intermediary of thin wall portions continued from the peripheral edges of the projections, wherein a thermoplastic elastomer is used as a molding material, and wherein the thick projections, the thin wall portions, and the base are integrally molded by supplying a mass of the molding material into a mold through a gate provided adjacent the center of a portion corresponding to each of the projections. The method requires no vulcanization and permits efficient production. Furthermore, it allows well balanced flow of the molding material and eliminates the possibility of burrs and sink marks being produced.

4 Claims, 1 Drawing Sheet

MOLDING METHOD FOR MANUFACTURE OF A RESIN MOLDED PART

This is a continuation of application Ser. No. 258,056, filed Oct. 14, 1988, now abandoned.

BACKGROUND OF THE INVENTION

1. FIELD OF THE INVENTION

This invention relates to a molding method for manufacture of resin moldings and, more particularly, a resin molded part having movable projections suitable for use in such applications as, for example, a remote control unit or the like control element for a TV set or video tape recorder, and a keyboard for a portable electronic calculator.

2. DESCRIPTION OF THE PRIOR ART

Such control element or keyboard has a number of push-buttons and is generally of such arrangement that the push-buttons, upwardly biased by internally provided springs, are depressibly seated in corresponding holes provided in a base. However, such arrangement has a drawback that it requires a large number of parts, which often leads to a high cost of manufacture.

In view of this problem, some users have been employing molded parts in which a base and pushbuttons are integrally formed. Molded parts of this type use rubber as a molding material therefor and they are such that one or more pushbutton-shaped thick projections are formed integrally with a base through the intermediary of thin wall portions continued from the peripheral edges of the projections so that the projections are flexibly movable.

True, such rubber moldings involve less number of parts; on the other hand, however, the fact that they require vulcanization poses a problem that the process of molding takes considerable time, which means lower producting. In an attempt to solve this problem, it has been proposed to use a resin which requires no vulcanization and which permits ease of molding and to carry out integral molding by employing a conventional sidegate type mold, for example. However, such attempt has not been successful, since they involve high possibility of burrs and sink marks being produced because of unfavorable heat balance between thick projections and thin wall portions.

SUMMARY OF THE INVENTION

This invention is intended to overcome these difficulties with the prior art. Therefore, it is an object of the invention to provide a molding method which permits efficient production of an integral molded part having movable projections which serve as pushbuttons, without burrs and sink marks being produced.

It is another object of the invention to provide a molding method for manufacture of a resin molded part having flexibly movable pushbutton-shaped thick projections formed integrally with a base through the intermediary of thin wall portions continued from the peripheral edges of the projections.

It is a further object of the invention to provide a molding method for manufacture of a resin molded part having movable projections suitable for use in such applications, for example, a control element for a remote control unit in a TV set or video tape recorder, or a keyboard for a portable electronic calculator.

In order to accomplish these objects, the invention provides a molding method for manufacture of a resin molded part having one or more flexibly movable, pushbutton-shaped thick projections formed integrally with a base through the intermediary of thin wall portions continued from the peripheral edges of the projections, characterized in that a thermoplastic elastomer is used as a molding material, and in that the thick projections, the thin wall portions, and the base are integrally molded by supplying a mass of said molding material into a mold through a gate provided adjacent the center of a portion corresponding to each of said projections.

As above stated, according to the invention, a thermoplastic elastomer which requires no vulcanization is used as a molding material. Therefore, molding operation takes no lengthy time, and it is possible to efficiently produce resin molded parts by employing a high-efficiency molding method, such as for example injection molding. Further, the fact that each gate is located adjacent the center of a corresponding thick projection permits containment in the projection interior of a less hot mass of molding material introduced right after the start of molding operation and uniform spread of a subsequently introduced mass of molding material having higher temperatures and higher fluidity from the center gate portion and toward the peripheral edge portion, thus allowing satisfactory molding material flow from the thin wall portion to the base. In addition, a parting line portion is spaced by both the thin wall portions and the base so that it is positioned most remote from the individual gates; therefore, the parting line portion is unlikely to be subject to high molding pressure and burr formation.

One embodiment of the invention will now be described with reference to the accompanying drawings.

DETAILED DESCRIPTION OF THE PREFERRED EMBODIMENTS

Figure 1:
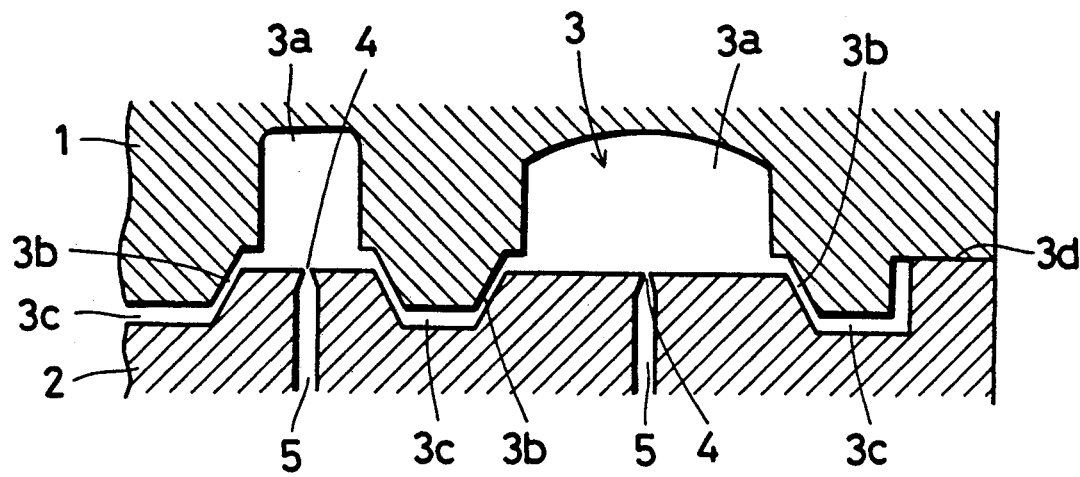
FIG. 1 is a sectional view showing by way of example an injection mold employed in practicing the method of the invention.

In the injection mold shown in FIG. 1, a cavity 3 is defined by a movable part 1 and a fixed part 2. Shown by 3a, 3b, 3c are, respectively, cavity portions corresponding to thick projections, thin wall portions, and a base of a molded part; and 3d is a parting line between the parts 1 and 2 of the mold. Each numeral 4 designates a gate provided so as to be positioned at the center of a corresponding cavity portion 3a. Each gate 4 leads to a supply source of a molding material through a runner 5 and a sprue (not shown). For the molding material, a thermoplastic elastomer is used. Molding operation is carried out in same manner as in the case of conventional injection molding. Molding conditions, such as temperature and pressure, may be suitably selected according to the type of thermoplastic elastomer used and the configuration and size of the resin molded part to be produced.

Figure 2:
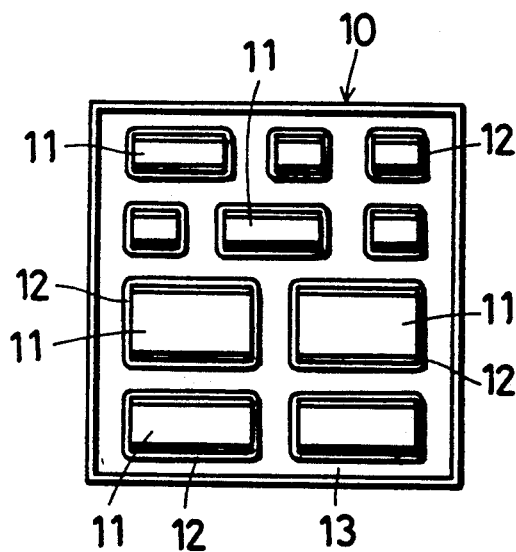
FIG. 2 is a front view showing by way of example a resin molded part produced in accordance with the method of the invention.
Figure 3:
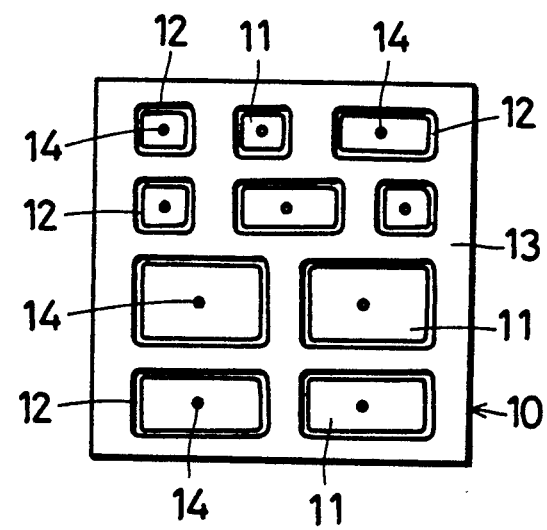
FIG. 3 is a rear view thereof.

FIGS. 2 and 3 show by way of example a molded part 10, in which pushbutton-shaped thick projections 11 are formed integrally with a base 13 through the intermediary of thin wall portions 12 continued from their peripheral edges, all the projections 11 being of same height and arranged in same plane. Each numeral 14 is a gate mark located centrally on the underside of a corresponding projection 11. Each thin wall portion 12 is flexible and moderately inclined, so that when a corresponding projection 11 is pushed on the top, a certain limited force is produced to sharply deform the thin wall portion 12 so as to allow the projection 11 to be depressed. That is, the thin wall portions 12 are bendable in and out and accordingly the projections are flexibly movable downward and upward. Therefore, by arranging electrical contacts on the respective undersides of the projections 11 it is possible to obtain a push-button switch unit which is convenient to manipulate.

A typical example of thermoplastic elastomer useful for the purpose of the invention is a thermoplastic polyester elastomer produced by E.I. duPont de Nemours & Co. or DU PONT-TORAY CO., LTD. and which is Commercially sold under the trade name of "HYTREL". More particularly, a variety having a Shore hardness of 40D, preferably 35D, can be advantageously used. It has been also found that other crystalline thermoplastic elastomers, such as polyurethane elastomer, polyamide elastomer, and polyolefin, of low Shore hardness grade can be used with similar good results.

Figure 4:
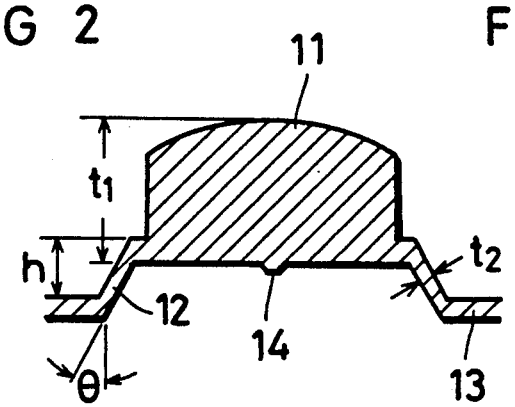
FIG. 4 is a fragmentary enlarged view in section thereof.

For use in applications such as final control element for a remote control unit or keyboard for a portable electronic calculator, molded parts may be suitably designed according to relevant specifications, with respect to the number of projections, their sizes, and their arrangement. These factors have little bearing on the results of molding and can be flexibly determined according to the specifications. On the other hand, however, thickness of each projection 11 and that of each thin wall portion 12 have considerable bearing on the flow of the molding material. For such thickness factors, therefore, appropriate values should be selected. It has been found that, as FIG. 4 shows, where the thickness $t_1$ of a projection 11 is 3~4 mm and the thickness $t_2$ of a thin wall portion 12 is 0.1~0.2 mm (preferably 0.11~0.15 mm), satisfactory result are obtained. In order to provide smooth and flexible handling characteristics it is essential that the thin wall portions 12 must be properly designed in inclination and height. Where their inclination $\theta$ and height h are respectively of the order of 40~60° and 1.5~2 mm, satisfactory results have been obtained.

In the above described embodiment, each gate 4 is provided at the center of a corresponding cavity 3a. Alternatively, the gate may be concentrically located insofar as such location is not detrimental to the merit of the invention. Again, in the foregoing embodiment, one gate 4 is provided for each projection 11; but where the projection 11 is large, the number of gates may be increased as required.

What is claimed is:

1. A resin molded part comprising:
   a base;
   one or more flexible and movable push-button-shaped thick projections formed integrally with said base; and
   thin wall portions continued from the peripheral edges of the button-shaped thick projections to said base, said thin wall portions being 0.1 to 0.2 mm in thickness and having an inclination of 40–60°.

2. A resin molded part according to claim 1, wherein said push-button-shaped thick projections, base and thin wall portions are integrally molded from a crystalline thermoplastic elastomer.

3. A resin molded part according to claim 2, wherein the resin molded part has two or more projections of the same height arranged in the same plane.

4. A resin molded part according to claim 3, wherein said thermoplastic elastomer is a thermoplastic polymer elastomer with a Shore Hardness of less then 40 D.

* * * * *

UNITED STATES PATENT AND TRADEMARK OFFICE
CERTIFICATE OF CORRECTION

PATENT NO. : 5,011,728
DATED      : April 30, 1991
INVENTOR(S) : Eiji Imae, et al It is certified that error appears in the above-identified patent and that said Letters Patent is hereby corrected as shown below:

On Title Page and in Col. 1 line 6;
Column [63] Related U.S. Application Data:

>  After "abandoned" enter --which is a Continuation of Ser. No. 044,906, Apr. 30, 1987, abandoned.--

Signed and Sealed this

Fifteenth Day of September, 1992

Attest:

DOUGLAS B. COMER

*Attesting Officer*   Acting Commissioner of Patents and Trademarks